United States Patent [19]
Deni et al.

[11] Patent Number: 5,699,708
[45] Date of Patent: Dec. 23, 1997

[54] PUNCH PRESS DEVICE

[75] Inventors: Frank Deni, Williamsville; Joseph A. Deni; Leonard A. Deni, both of E. Amherst, all of N.Y.

[73] Assignee: Unittool Punch & Die Company, Buffalo, N.Y.

[21] Appl. No.: 520,293

[22] Filed: Aug. 28, 1995

[51] Int. Cl.$^6$ .............................. B23D 21/14; B26F 1/14
[52] U.S. Cl. ..................... 83/180; 83/192; 83/639.5; 83/687
[58] Field of Search .................. 83/180, 192, 639.1, 83/639.5, 54, 193, 194

[56] References Cited

U.S. PATENT DOCUMENTS

| | | | |
|---|---|---|---|
| 1,503,551 | 8/1924 | Nice | 83/193 |
| 1,595,678 | 8/1926 | Murphy | 83/194 |
| 2,231,638 | 2/1941 | Rigdon | 83/639.1 |
| 2,325,437 | 7/1943 | Temple | 83/194 |
| 2,423,791 | 7/1947 | Nelson | 83/194 |
| 2,884,066 | 4/1959 | Teplitz et al. | 83/180 |
| 4,030,391 | 6/1977 | Swanson et al. | 83/639.5 |
| 4,524,660 | 6/1985 | Yonezawa | 83/639.1 |

FOREIGN PATENT DOCUMENTS

| | | | |
|---|---|---|---|
| 1181565 | 6/1959 | France | 83/180 |
| 2231517 | 1/1974 | Germany | 83/180 |

*Primary Examiner*—Kenneth E. Peterson
*Assistant Examiner*—Sean A. Pryor

[57] ABSTRACT

The invention provides a punch press capable of impressing a plurality of holes or other changes in a workpiece. The central core piece of the punch press receives the workpiece and expands until it touches the inner walls of the workpiece. This holds the workpiece in place and prevents any workpiece movement or distortions in the holes formed because of movement of the workpiece. Hydraulic cylinders impel the plurality of punches toward the workpiece at substantially the same pressure and time.

5 Claims, 3 Drawing Sheets

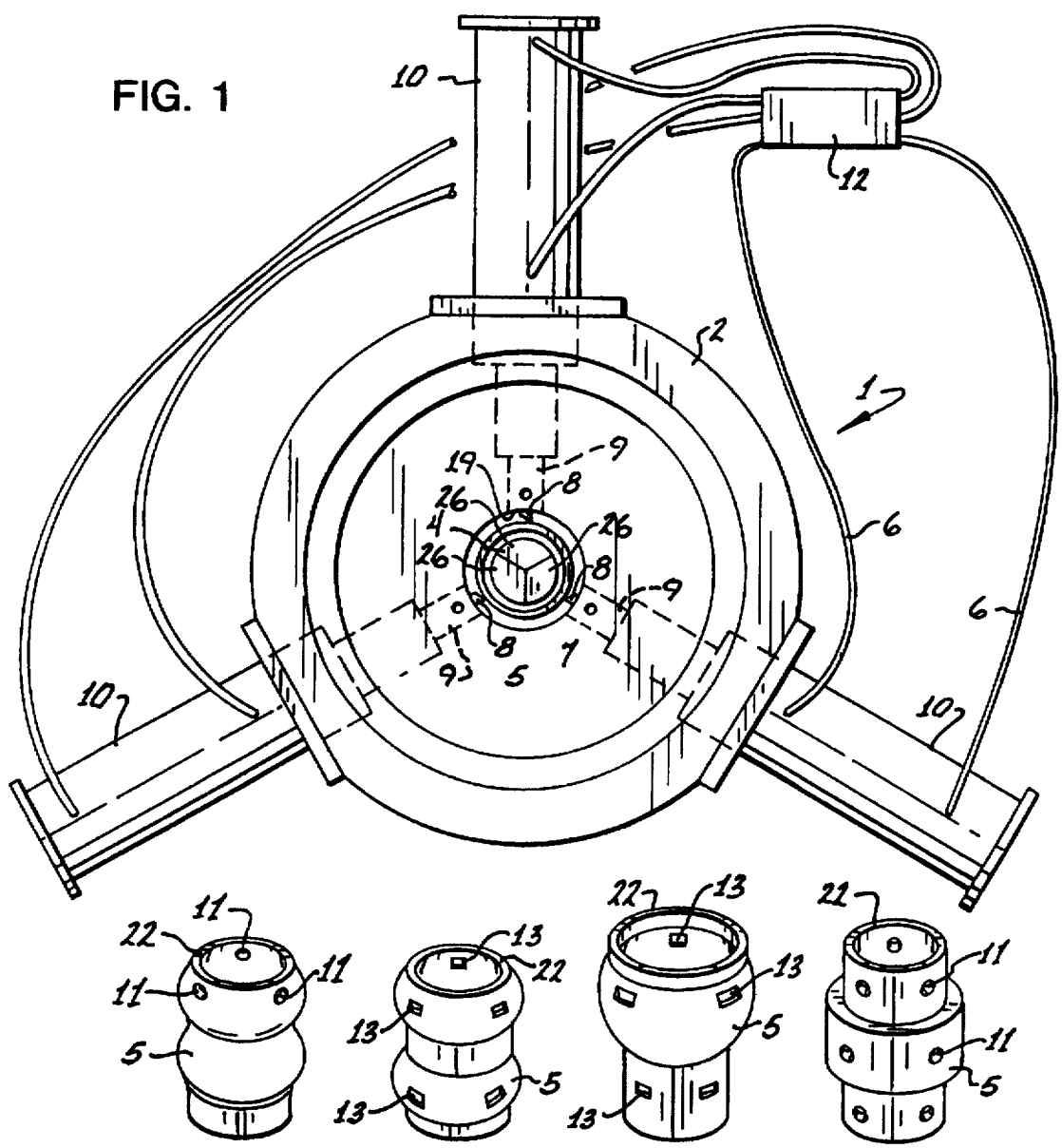
FIG. 1
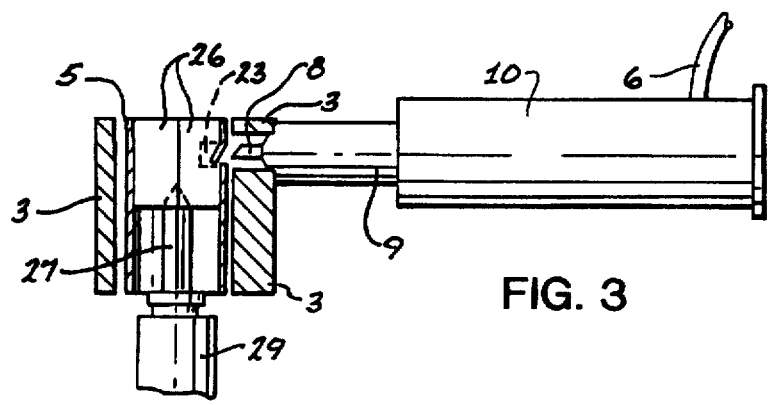
FIG. 2A   FIG. 2B   FIG. 2C   FIG. 2D
FIG. 3

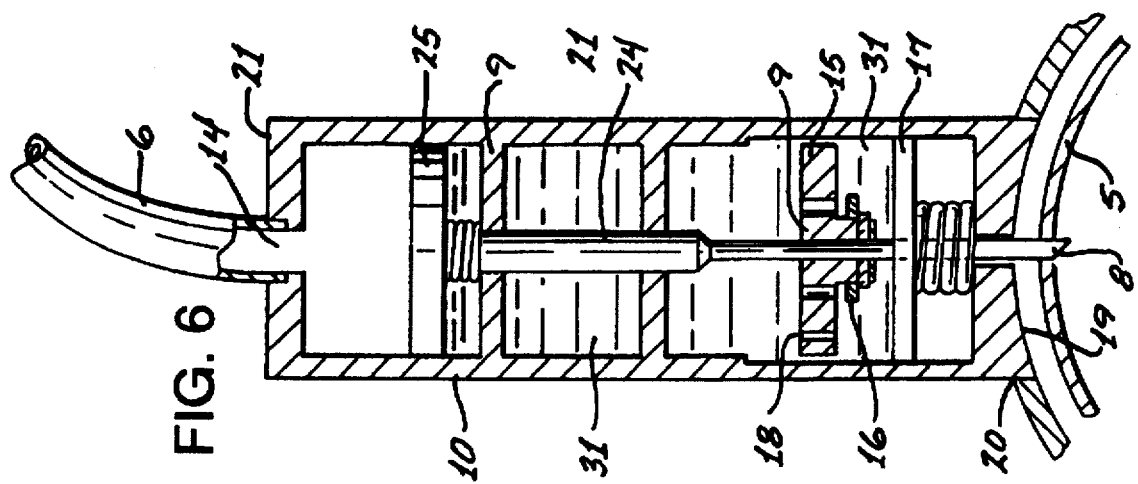
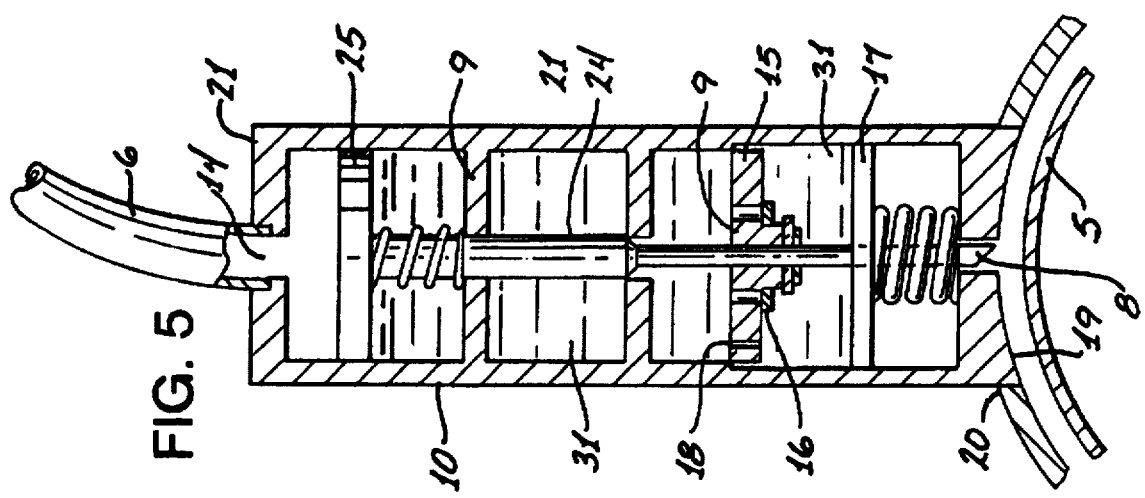
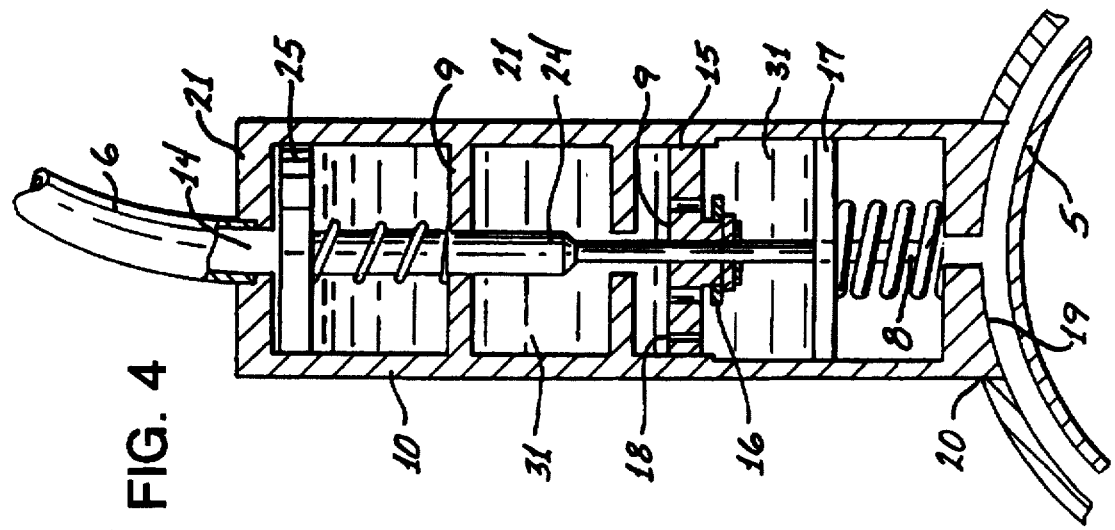

FIG. 7
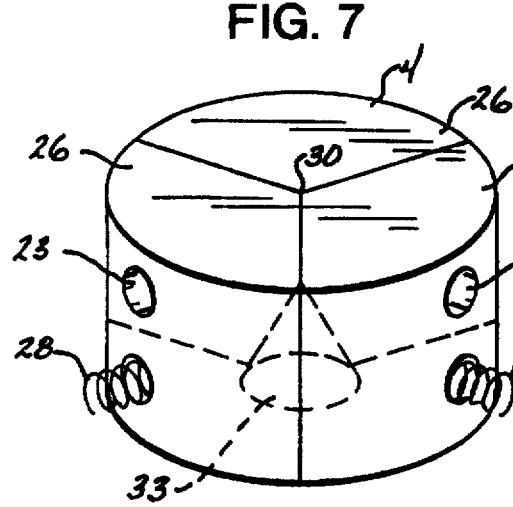
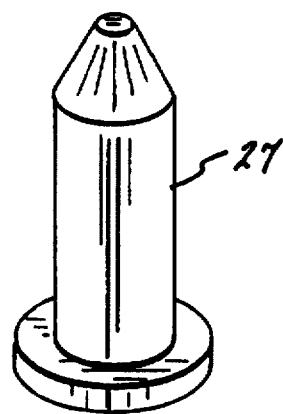
FIG. 8
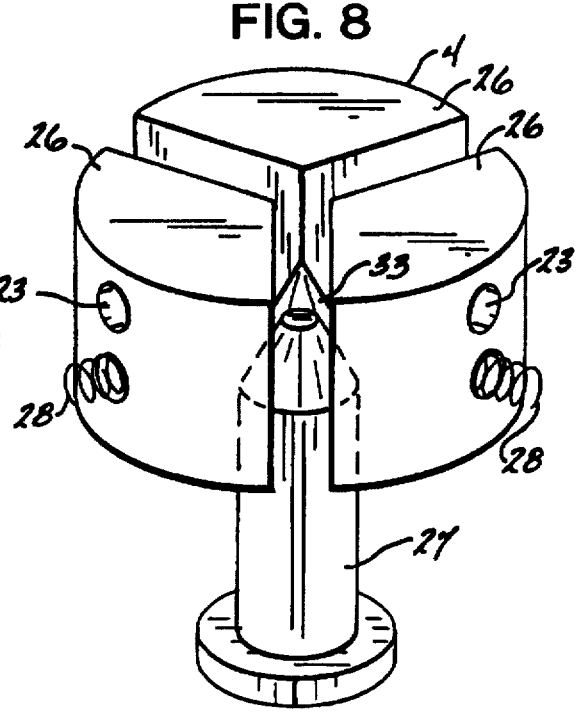
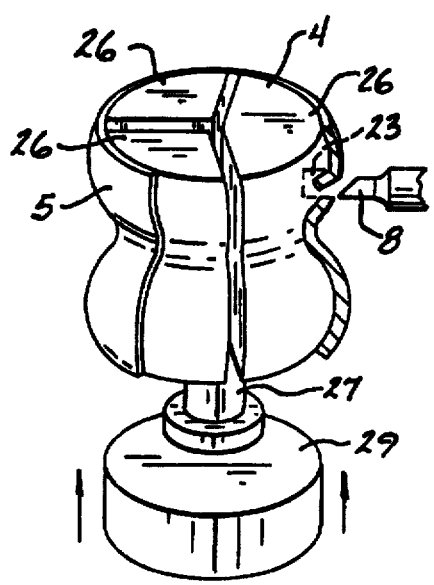
FIG. 9

PUNCH PRESS DEVICE

This invention relates to a punch press device and more particularly to a machine that will punch at least two concurrent impressions.

BACKGROUND OF THE INVENTION

There are known several methods of punching holes or impressions into workpieces such as metal tubing and the like. Some of these prior art devices create multiple holes or bends in a single operation of a single punch. Typical prior art devices are disclosed in U.S. Pat. Nos. 2,310,083; 2,653,664; 3,125,149; 3,271,988; 4,227,393 and 4,930,384. In U.S. Pat. No. 2,310,083 (Holmes, et al) two movable dies are used to clamp a workpiece or tubing to form a bulge in a side wall of the tubing. The punch then pierces the bulged portion of the tubing. In Holmes it is necessary to deform the tubing to form a bulge before the engaged tubing can be pierced. Holmes also pierces the tubing along the same line in a series of punch operations. In many instances deformation of a workpiece is highly undesirable, especially when uniformity of finished workpieces is required.

In Dolby (U.S. Pat. No. 2,653,664) a method is disclosed for forming an elongated clip receiving openings in a pipe or tubular member. Dolby uses a pair of complimentary pipe-supporting dies which define between them a transverse slot of a size and shape corresponding to the desired clip receiving opening. A punch is then placed in the opening and forced through the exposed wall of the pipe to punch out the desired hole. The initial cutting edge of the punch when it engages a pipe to be cut depresses the wall of the pipe transversely along a line extending beyond the edge of the opening, laterally to the axis of the pipe. Dolby's method also substantially deforms the workpiece as it perforates it in a single operation.

U.S. Pat. No. 3,125,149 (May) disclosees a process for perforating tubing which involves deforming the tube during the piercing step and subsequently reshaping the tube to its round condition. May's punch includes a perforator for piercing the holes: the punch also having a reshaping cavity or recess to fit over the tube which is deformed during the piercing operation and which thereafter is reshaped to substantially its original round condition. The workpiece tube of May's is placed in a punch press and a downward pressure is exerted whereby the punch cuts through the upper wall of the tube and upon further downward movement cuts through the lower wall as is shown in May's FIG. 4. May's method punches holes in a workpiece 180° apart from each other in one operation. During this piercing operation, the cutting edge of the punch initially cuts through the upper wall portion which is unsupported and thus deforms the tube by forming a dimple around the upper hole. After the perforation of an upper and lower hole the punch holder moves downwardly so that the reshaping operation can take place.

In U.S. Pat. No. 3,271,988 (Klinksiek) a method of forming a hole in the wall of a hollow workpiece is disclosed. In Klinksiek's process a metal wall portion of a workpiece is first drilled to a predetermined distance to provide a relatively thin wall portion and subsequently driving a punching element into that wall section to provide a porthole. This prior art method is intended to minimize deformation and provide a smooth rounded mouth at the inner side of the perforated cylinder wall.

In McElhaney (U.S. Pat. No. 4,227,393) a method is disclosed for punching holes in cylindrical tubing from the inside of the tubing rather than from the outside. His device uses a mandrel to locate the position of the punch and allows the punch to operate when in the proper position. Power means move an actuator into the stationary mandrel where the punch is forced outward through a guide aperture of the mandrel to punch an opening in the tubing.

The Nakatsuji patent (U.S. Pat. No. 4,930,384) discloses and teaches the use in a system of a technique to cut notches in the side of hollow tubing but not in round shapes. The die used by Nakatsuji has a cutting blade with first and second spaced wedge-shaped projections, each projection having an apex at its leading end and a cutting edge between the projections in a trailing direction from the apexes of the projections. Only the apexes of the projections penetrate the workpiece wall at discrete locations. The desired results are clean cut apertures in the tubing with minimal deformation.

All of the above discussed prior art is concerned with providing clean cut apertures with little workpiece deformation. One method requires reshaping the tubular workpiece after punching a hole therethrough to ensure its return to its original round configuration. There is therefore a need for a punch press system that can efficiently punch multiple holes, notches or impressions in a tubular workpiece with a minimal deformation.

SUMMARY OF THE INVENTION

It is therefore an object of this invention to provide a punch press system and apparatus devoid of the above noted disadvantages.

Another object of this invention is to provide a system capable of forming multiple holes or impressions on a tubular workpiece with a minimum of tubular deformation.

A further object of this invention is to provide a relatively uncomplicated method and apparatus for forming multiple impressions on a tubular workpiece with a minimum of tubular deformation.

A further object of this invention is to provide a relatively economical, uncomplicated method and apparatus for forming multiple impressions in a single operation with more than one punch.

Still a further object of this invention is to provide an apparatus and method for at least double piercing capability and the formation of relatively clean apertures or impressions therein.

Another still further object of this invention is to provide an efficient punch system that simultaneously imparts apertures or impressions in a tubular workpiece in a simple hydraulic one step operation.

The foregoing objects and others are accomplished with this invention by a punch press system having a central circular housing having two or more hydraulic pumps attached thereto to initiate the punching operation. These hydraulic pumps have punches located therein with guides to direct the punches to the tubular workpieces to be punched. The punches are in air connection to the hydraulic pumps, the hydraulic pumps being simultaneously activated by a power controller. The hydraulic pumps supply the pressure to move the punches toward the workpiece at substantially the same speed and pressure. The workpiece fits snugly into a central workpiece housing which holds the workpiece in place during the punching operation. The press is activated and controlled so that all punches hit the workpiece at substantially the same time with, as noted earlier, the substantially same pressure. The workpiece can be a tubular structure such as a car muffler pipe or any other structure and while usually is metallic, it can be of plastic, fiberglass or any other suitable material.

BRIEF DESCRIPTION OF THE DRAWING

FIG. 1 is a top plan view of the apparatus of this invention illustrating the central tubular workpiece housing and the air-connected hydraulic pistons.

FIGS. 2A–D is a perspective view of the workpieces after being punched or impressed by the punch press device of this invention.

FIG. 3 is a side view of the system of this invention illustrating the the punch assembly just prior to contact with the workpiece.

FIGS. 4, 5 and 6 are plan views of the interior of the hydraulic cylinder pumps showing the specific components thereof and the stages of each stroke. FIG. 4 illustrates the initial rest position of the hydraulic cylinder, FIG. 5 the downward or outward movement of the stroke and FIG. 6 illustrates the end of the stroke, ie. contact with the workpiece.

FIG. 7 is a perspective view of the spring loaded movable three piece central core in its closed position. Also shown is the movable plunger which will contact and separate the three pieces when required.

FIG. 8 is a perspective view of the spring loaded movable three piece central core in its open position when separated by the movable plunger.

FIG. 9 is a plan view of the core-punch assembly showing the position of the plunger and core movable components relative to the workpiece.

DETAILED DESCRITPION OF THE DRAWING AND THE PREFERRED EMBODIMENT

In FIGS. 1 and 3, the system 1 of this invention is shown with the central housing 2 enlarged to show detail. Located centrally in housing 2 is a workpiece circular support section 3 made up of a central core 4 around which a tubular workpiece 5 will fit. The central core 4 is shown throughout the drawings as having three distinct movable wedge-shaped sections 26: however, any number of wedge-shaped sections 26 may be used if desired. In FIGS. 1 and 3 details of these wedge-shaped sections 26 are not shown for the sake of overall clarity; however, FIGS. 7-9 show the specific details of these sections 26 with mandrel 27. The space 7 between the central core 4 and the circular section 3 should be substantially the same as the thickness 22 of the tubular workpiece 5 so that the workpiece 5 fits snuggly therein. Workpieces 5 are shown in FIG. 2A–D after perforation by punch 8. Punch 8 is held in place by a punch guide 9 (shown in FIGS. 3–5) which ensures that punch 8 will travel in a straight path. The hydraulic cylinders 10 contain the punch 8 and the punch guides 9 and supply the pressure via air conduits 6 (or tubes) that will impel all punches 8 at the same time in contact with workpiece 5. As all punches 8 hit the workpiece 5 at the same time, the impact pressures are equalized and little, if any, workpiece deformation occurs. This provides an efficient system for imparting simultaneous holes or impressions in a tubular workpiece without noticeable deformation. Shown in FIG. 3 are end portions of punch guides 9 which are curved to fit each round workpiece selected; guides 9 and cores 4 are changeable depending upon the configuration and size of the tubular workpiece to be impressed. The sectional core 4 is provided with apertures 23 aligned with the punches 8 so that the punches 8 after traveling through workpiece 5 will not hit a hard metallic surface and become dull or broken. Thus, after piercing the workpiece 5 the punch 8 continues forward into the core apertures 23. The system of this invention does not require reshaping after the workpiece 5 has been simultaneously pierced or impressed. Any desired number greater than one of punches 8, cylinders 10 or holes 11 may be used or affected depending upon upon the workpiece desired. Also as earlier noted, any number of movable sections 26 may be used as the central composite core 4. The impressions 11 may be holes 11 or may be a notch 13 or any other impression. It is critical to the present invention that all of the punches 8 impact the workpiece 5 at substantially the same pressure. This is necessary to ensure minimal deformation and equally clean clear holes or impressions. Each of the hydraulic cylinders or pumps 10 are substantially identical and are connected via tubes 6 to a controller 12 that ensures that all cylinders 10 receive the same pressure at the same time. Any suitable control means 12 may be used such as "Alpha Series Body Ported Valve" models available from Aro Fluid Products Division, Aro Corp. of Bryan, Ohio.

In FIG. 2A–D workpieces 5 after processing by piercing or notching are shown. Notches 13 or holes 11 may be put into each workpiece 5 depending upon the desired result.

In FIG. 3 a space is shown between support wall 3 and workpiece 5 only to show clearly the components; actually workpiece 5 fits tightly against wall 3 so that there is little or no movement upon impact by punch 8.

In FIGS. 4–6 all cylinders 10 are air connected to a controller 12 via tubes 6 that regulate each hydraulic cylinder 10 to provide the synchronization of time and pressure to all cylinders 10. Air inlet tubes 6 are connected from controller 12 to each cylinder 10 to be used, the number of cylinders 10 used can be from at least two to any number; of course, one may be used if desired. The tubes 6 will carry the air pressure to air inlets 14 in an amount necessary to activate the hydraulic pumps 10 which will impel all the punches 8 forward (toward the workpiece 5) at the same time. The hydraulic pumps 10 in FIGS. 4, 5 and 6 are broken away so that the interior can be illustrated. The high pressure is obtained by the ratio between the area of the cylinder piston 10 and the area of the larger piston rod 24. The high pressure times the area of the ram piston 15 gives the H.P. force. In order for the device to work properly, the oil 31 within each cylinder 10 should be kept on the right level. The air valve 25 has to function immediately. Obviously, any other suitable type of pump may be used as long as it provides equal time, movement and pressure to the punches 8. At the cylinder end 21 furthest the workpiece is an air inlet opening 14 to which tubes 6 are connected to supply the air and air pressure to each cylinder 10. Punches 8 are located in each cylinder 10 and are spring loaded through guides 9 which maintain precise alignment of the punches 8 and their paths. As air pressure is applied from tubes 6 via air inlets 14, the piston 15 starts to move and the return valve 16 is in the closed position 32 immediately as shown in FIG. 5 at position 32. When the resistance of the ram 17 becomes too great, the piston 15 only creeps due to oil 31 escaping through the bleed hole 18. The punch 8 is moved through the cylinder and out from curved surface 19 (to conform to the tube surface) terminal section 20 to contact the adjacent workpiece 5.

By "plurality" in this disclosure is meant more than one. By "forward" in this disclosure is meant a direction toward the workpiece. By "impression" is meant a hole 11, a single or sequential change (nibbling), a notch 13, changes of piercing, countersinking, embossing, lancing, notching or any other physical change imparted by punch 8 upon a tubular or other shape workpiece. Also, a single or multiple holes may be impressed at different locations on the work piece as desired.

In FIGS. 7-9, when the workpiece 5 configuration and size is determined, a central core 4 is selected that will fit into and conform to the shape of the workpiece 5. This is critical since the core 4 must fit tightly against and conform to the contour of the inner tubular wall of workpiece 5 so that the appropriate impression can be made without movement and deformation. Each changable core 4 must be selected to fit each specific workpiece 5 to be impressed. The workpiece 5 is fit around core 4 when core 4 is in its closed position (wedges 26 touching) as shown in FIG. 7. The core 4 is shown with three springs 28 loaded wedge-shaped movable sections 26; however, as noted earlier any number of sections 26 may be used. Best results have been obtained using three sections, however. Once the workpiece 5 is fit over central core 4 a movable mandrel 27 is moved up into or wedged between the sections 26 and force them apart and against the inner surface of tubular workpiece 5. This wedging of mandrel to separate wedges 26 is shown in FIGS. 8 and 9 where mandrel 27 is shown pushed up into the central part of core 4 dividing and separating the wedges until they are stopped by the inner wall of workpiece 5. By this method, any configuration workpiece 5 can be simultaneously impressed with a plurality of impressions whereas it was not practical with prior art punch presses. The springs 28 are located at the bottom of movable sections 26 so that the workpiece 5 can easily slide over the core 4 without any obstructions from springs 28 or any other hinderance. The mandrel 27 is a pointed rod or plunger which will wedge in the cone shaped opening 33 between sections 26 and move them outwardly tightly toward the inner surface of tubular workpiece 5. The mandrel 27 is moved upwardly by any known hydraulic (or other convenient means) pressure or mechanical means. Once the workpiece 5 has been impressed or worked on, the mandrel 27 falls from or is withdrawn from cone opening 33 between the wedge-shaped sections 26 and the sections recede toward the center of core 4 and the workpiece is loosened and easily removed. Core 4 is made up of the wedges 26. Each of wedge-shaped sections 26 has an aperture (or apertures) 23 which is in alignment with each punch 8 so that as the punch 8 passes through the workpiece 5 it subsequently fits into the aperture 23 or core 4 rather than hiring a hard metal surface which would dull or break punch 8. As noted earlier, mandrel moving means 29 will push the mandrel 27 up into the meeting point 30 of the movable wedges and force them apart.

The core means 4 can be of a round configruation if a tubular workpiece is to be used or can have a square, conical, triangular or other configuration to suit the shape of the workpiece to be used.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A punch press having a circular main housing and a plurality of air cylinders connected to said main housing, said main housing having at a central portion thereof a centrally disposed workpiece support section having a central core around which a tubular workpiece will fit, said air cylinders housing a plurality of punches having hydraulic means to impel said plurality of punches simultaneously forward upon demand toward said central core, said air cylinders having a first open terminal surface permitting a punch to pass therethrough and a second terminal surface connected to a source of air and an air pressure control means, said first open terminal surface being adjacent to a source of air and an air pressure control means, said first open terminal surface being adjacent said workpiece support section to provide means for said punches to substantially simultaneously contact said tubular workpiece which is supported in said workpiece support section, and wherein said centrally disposed workpiece support has a core means for said workpiece to fit tightly around, said core means comprising a plurality of sector-shaped movable wedge sections each of which having an inner edge, said wedges being movable from a first position to a second position, said inner edges meeting together along a central axis when at said first position, said wedges being movable to said second position by pushing a mandrel therebetween to outwardly separate said wedges and fit them tightly against a workpiece, said mandrel having removing means to withdraw said mandrel from said wedges to thereby loosen said workpiece after it has been impressed wherein said sector-shaped movable wedge sections have apertures each aligned with an adjacent punch to permit said punch to fit therein after an impression is made in said tubular workpiece.

2. The device of claim 1 wherein said air control means contains means to supply air pressure to each hydraulic air cylinder at substantially the same pressure and at substantially the same time.

3. The device of claim 1 wherein said punch is provided with means for puncturing a tubular workpiece.

4. The device of claim 1 wherein said punch has means for providing impressions on a tubular workpiece.

5. The device of claim 1 wherein said punch has means for providing notches on a tubular workpiece.

* * * * *